Dec. 19, 1950  L. C. ALMOND, SR  2,534,750
AUTOMATIC REPEATING ANIMAL TRAP
Filed Feb. 27, 1947  2 Sheets-Sheet 1

Inventor,
L. C. ALMOND, SR.

By E. E. Vrooman & Co,
Attorneys.

Dec. 19, 1950   L. C. ALMOND, SR   2,534,750
AUTOMATIC REPEATING ANIMAL TRAP
Filed Feb. 27, 1947   2 Sheets-Sheet 2

Inventor,
L. C. ALMOND, SR.

By E. E. Vrooman & Co.,
Attorneys

Patented Dec. 19, 1950

2,534,750

UNITED STATES PATENT OFFICE 2,534,750

AUTOMATIC REPEATING ANIMAL TRAP

Lathan C. Almond, Sr., Tucson, Ariz.

Application February 27, 1947, Serial No. 731,384

4 Claims. (Cl. 43—73)

This invention relates to an automatic repeating animal trap.

An object of the invention is the construction of an efficient and novel apparatus for the capture of animals.

Another object of the invention is the construction of an efficient apparatus for pushing or shoving animals into a prison pit.

A still further object of the invention is the construction of a novel and efficient apparatus that may be set for repeatedly performing the operation of pushing or shoving animals into a prison pit.

With the foregoing and other objects in view, my invention comprises certain novel constructions, combinations, and arrangements of parts as will be hereinafter fully described, illustrated in the accompanying drawings, and more particularly pointed out in the appended claims.

In the drawings:

Fig. 1 is a view in side elevation of an apparatus constructed in accordance with this invention while

Figure 3:
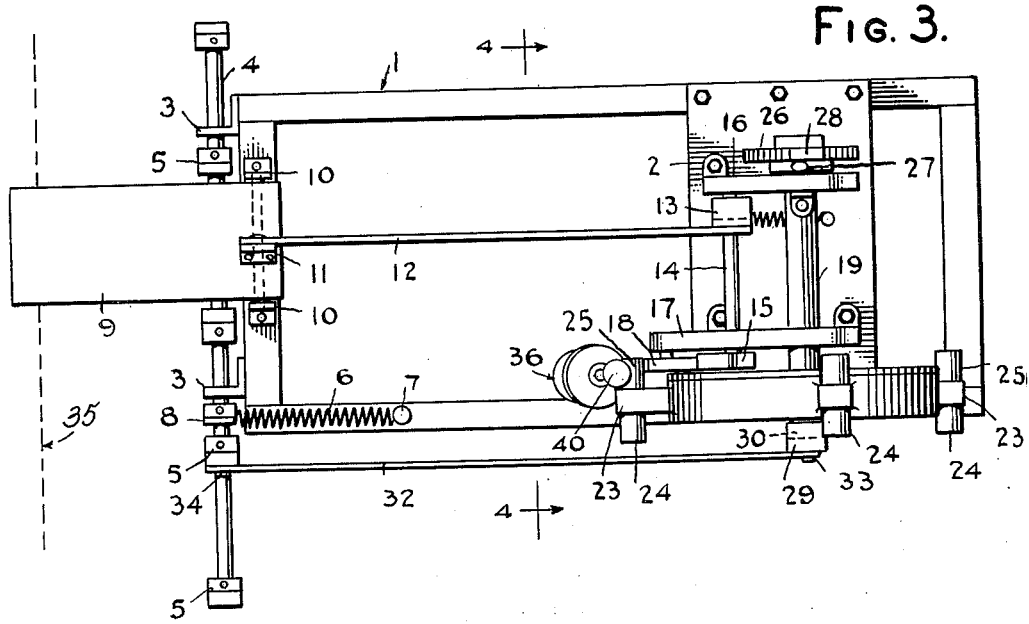
Fig. 3 is a top plan view.

Referring to the drawings in which the preferred embodiment is illustrated, 1 designates a frame that is provided with a platform 2 constituting a part of the frame. On one end of frame 1 are two brackets 3, in which brackets is rotatably mounted a rocking shaft 4. A plurality of pusher bars 5 are fixedly secured upon said rocking shaft 4; these bars 5 are usually in a vertical position. This usual position is obtained by means of a coil spring 6 being connected at its inner end to a nail 7, or the like, while its outer end is connected to spring finger 8 that is fixedly secured to rocking shaft 4.

A foot pedal 9 is pivotally supported upon brackets 10. A lug 11 is secured to foot pedal 9 at its inner end. A pedal link 12 is pivotally secured at its outer end to lug 11 and its inner end is pivotally secured to the lower end of arm 13, Fig. 4. The arm 13 is fixedly secured to the dog carrying shaft 14. Shaft 14 has dog 15 fixedly secured thereto.

Figure 1:
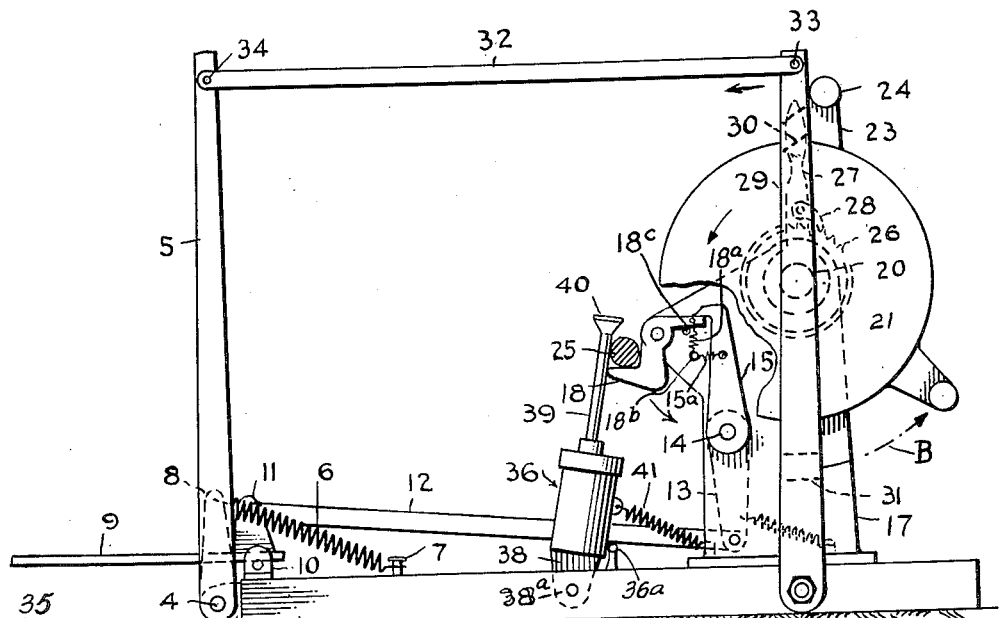

Mounted on frame 1 is a primary standard 16 and an auxiliary standard 17. The dog carrying shaft 14 is rotatably mounted on standards 16 and 17. Pivotally mounted on auxiliary standard 17 is a weighted pawl 18. This pawl is substantially Z-shaped for the purpose hereinafter described. Dog 15 normally hooks over the upper inwardly extending portion of the Z-shaped pawl 18 as is clearly seen in Fig. 1. A pin 18c is suitably supported upon the frame, against which pin the pawl 18 normally rests. A pin 18b is also suitably supported upon the frame 1, and to this pin 18b are attached the outer ends of coil springs 18a and 15a. The inner end of coil spring 18a is attached to the pawl 18, while the inner end of spring 15a is attached to the dog 15.

A sleeve 19 (Fig. 4) is mounted upon the standards 16 and 17. A spring shaft 20 extends through sleeve 19, and has supported on its inner end rotatable spring casing 21. In casing 21 is a spiral spring 22, the inner end of which is fixedly secured to shaft 20, while its outer end is fixedly secured to casing 21, as clearly shown in Fig. 5. Integral with casing 21 are preferably three studs 23. Each stud 23 has a pusher finger 24 and a shocker finger 25; these fingers extend in opposite directions for the purpose hereinafter described.

To wind the spring 22 in casing 21, a ratchet 26 is fastened on shaft 20, with operating handle 27 loosely mounted on sleeve 19. A pawl 28 is pivotally mounted on handle 27, the pawl engaging the ratchet teeth on ratchet 26. Therefore, when the operator swings handle 27 to the left, Fig. 2, the spiral spring 22 will be wound within the casing 21.

A power bar 29 is provided, this bar being pivotally mounted at 30a upon one side of the frame 1. The power bar 29 is provided with an upper slot 30 which is inclined as will be seen by noting the dotted lines in Fig. 1. The power bar 29 is also provided with a lower slot 31. A pusher bar link 32 is pivotally connected at its inner end at 33 to the top of power bar 29. The pusher bar link 32 is pivotally connected at 34 to one of the swinging pusher bars 5, whereby when the power bar 29 is forced slightly to the right, Fig. 2, the pusher bars 5 will move outwardly or forwardly to push an animal into the prison pit 35, Fig. 1.

A shocker device 36 is provided, which comprises a casing 37, a depending lug 38 and a spring pressed plunger 39; plunger 39 is provided with head 40. The lug 38 is pivotally connected at 38a (Fig. 1) to the inner face of one of the sides of frame 1. The head 40 is in the path of movement of the shocker fingers 25. A coil spring 41 is fastened at one end to the side of casing 37 while its other end is fastened to the auxiliary standard 17; this spring 41 normally holds the head 40 in the path of movement of the shocker fingers 25. A stop 36a prevents device 36 from swinging too near casing 21.

Figures 2, 4, 5, 6:
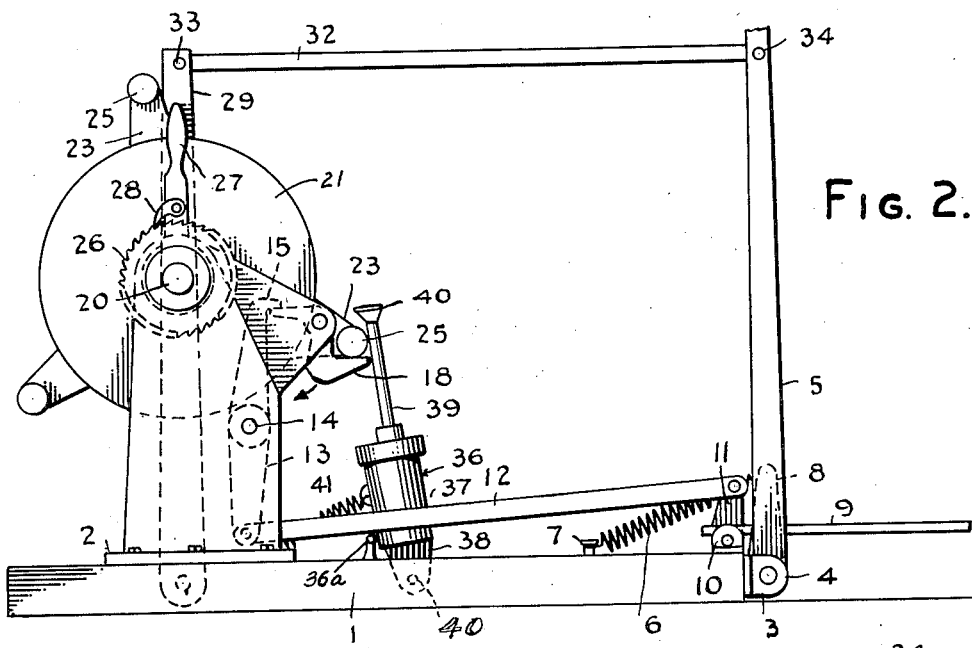
Fig. 2 is a view in side elevation of the opposite side of the same.
Fig. 4 is a transverse sectional view taken on line 4—4, Fig. 3, and looking in the direction of the arrows.
Fig. 5 is a vertical central sectional view of the rotatable spring casing, showing the spiral spring therein.
Fig. 6 is a vertical sectional view of the casing of the pivotally mounted shocker device, with parts of the device shown in side elevation.

In operation, the apparatus is placed in the desired position in the field or timber, or the like, the operator having wound the spring, the apparatus is ready to operate. Of course, the prison pit 35 has to be provided in which the animal is to be pushed. The bait can be placed in any suitable manner near the pedal 9, since the bait and the means for securing same form no part of the invention. When the animal steps upon the foot pedal 9, this will force the pedal downward, causing dog 15 to move away from the upper end of weighted pawl 18, whereupon the power of spring 22 is sufficient to cause rotation of the casing 21, resulting in the particular shocker finger 25, that is in engagement with pawl 18, to pivot the pawl sufficiently to clear same, and eventually passing through the lower slot 31, in the cycle of movement, as is indicated by dotted line "B," Fig. 1. During this operation the next contiguous shocker finger is approaching pawl 18, and as this approaching action is rather fast the shocker device is used. The approaching shocker finger first contacts the head 40, compressing the spring in casing 37 simultaneously with the movement of the shocker finger into its seated position on the weighted pawl as shown in Fig. 2. It is to be understood that immediately upon the clearing of the pawl 18 by the contacting finger 25, the pawl being weighted, will move back to its normal position, as shown in Fig. 2, ready to receive the next shocker finger 25. Simultaneously with this movement of the spring casing 21 the pusher finger will have engaged the power bar 29, and as rotary movement of casing 21 continues, the pusher finger will move down, entering the inclined slot 30, passing out said slot, as shown by dotted lines "A," Fig. 4. This pushing of power bar 29, through the power of spring 22, causes the swinging pusher bars 5 to move outwardly against the animal that is on the foot pedal, or contiguous thereto, resulting in the animal being thrown into the prison pit.

In further explanation of the operation, a shocker finger 25 (Fig. 3) first contacts head 40, and the head 40 is pressed downwardly until the beveled underside of head 40 contacts pawl 18, then head 40 is forced outwardly by the force of main spring 22, until shocker finger 25 passes head 40 and shocker finger 25 contacts pawl 18, which is temporarily rigid, being locked in place by dog 15 and stop pin 18c. Stop 36a for shocker device 36, prevents head 40 from coming in contact with spring casing 21, and only allows head 40 to come in line with path of shocker finger 25. Pawl spring 18a is much stronger than dog spring 15a, therefore, as soon as shocker finger 25 clears pawl 18, dog 15 is forced back by action of the upper arm of the pawl 18 and the bevelled horizontal arm of the dog 15, allowing pawl 18 to rest on stop pin 18c. As soon as pawl 18 clears dog 15, dog 15 is forced back in position to lock pawl 18, by force of dog spring 15a.

It is to be noted that the shocker device 36 acts as a brake on rapid rotation of the casing 21. The whole apparatus is adjusted to a nicety to synchronize the movements and actions of all of the cooperating elements, whereby efficient results are attained.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In an apparatus of the class described, the combination with a frame, of pusher bars pivotally mounted on said frame, a rotatable spring-containing casing on said frame, said casing provided with studs, said studs provided with pusher fingers, a power bar pivoted thereon and adapted to swing on said frame, said power bar being provided with slots through which said pusher fingers pass, said pusher fingers successively pressing upon said power bar when the spring-containing casing is rotating, for moving the power bar in one direction, and means connecting the power bar to said pusher bars.

2. In an apparatus of the class described, the combination of swinging pusher bars, a frame supporting said pusher bars, a power bar pivotally mounted on said frame, a pusher link connected at one end to said power bar and at its other end to said pusher bars, said power bar being provided with an upper inclined slot and with a lower slot, a spring operated casing contiguous to said power bar, said casing being provided with outstanding studs, said studs being provided with horizontal pusher fingers, said fingers being adapted to successively engage said power bar and slide along same and pass through said inclined slot, means for holding said casing against movement, and means for actuating said holding means thereby releasing said casing.

3. In an apparatus of the class described, the combination of a frame, swinging pusher bars on said frame, a primary and an auxiliary standard on said frame, a sleeve on said standards, a shaft extending through said sleeve, a spring casing on one end of said shaft, a shocker device on said frame contiguous to said spring casing, said shocker device being provided with a headed plunger, said spring casing being provided with studs, each stud provided with a shocker finger and a pusher finger, said shocker fingers being adapted to engage the head of said plunger, a pivotally mounted power bar on said frame contiguous to said spring casing, said power bar being provided with an inclined slot and a lower slot, said pusher finger being adapted to slide along a portion of said power bar and thence pass to said inclined slot for actuating said power bar, means connecting said power bar to said pusher bars, a weighted pawl on said auxiliary standard, said pawl being contiguous to said headed piston and in the path of movement of said shocker fingers, whereby a shocker finger contacts the headed piston first and then passes to said weighted pawl, each shocker finger being adapted to successively pass through the lower slot of said power bar, and a pedal actuated means including a dog, said dog normally engaging said weighted pawl for holding said pawl in a set position.

4. In an apparatus of the class described, the combination with a frame, of pusher means on said frame, means for actuating said pusher means, means for locking said actuating means in a stationary condition, said locking means comprising a weighted pawl, shocking means contiguous to said pawl, said shocking means being adapted to receive a portion of said pusher actuating means, and means for actuating said locking means for releasing same, whereby the pusher actuating means can function.

LATHAN C. ALMOND, Sr.

REFERENCES CITED

The following references are of record in the file of this patent:

UNITED STATES PATENTS

| Number | Name | Date |
| --- | --- | --- |
| 26,947 | Hunter | Jan. 24, 1860 |
| 828,139 | Owens | Aug. 7, 1906 |
| 1,464,697 | Connolly | Aug. 14, 1923 |
| 2,256,048 | Evans | Sept. 16, 1941 |